(12) United States Patent
Donovan

(10) Patent No.: US 9,869,546 B2
(45) Date of Patent: Jan. 16, 2018

(54) LASER DEVICE FOR PULLEY/SHEAVE ALIGNMENT

(71) Applicant: Brian J. Donovan, Marshfield, MA (US)

(72) Inventor: Brian J. Donovan, Marshfield, MA (US)

( * ) Notice: Subject to any disclaimer, the term of this patent is extended or adjusted under 35 U.S.C. 154(b) by 0 days.

(21) Appl. No.: 15/458,075

(22) Filed: Mar. 14, 2017

(65) Prior Publication Data

US 2017/0199031 A1 Jul. 13, 2017

Related U.S. Application Data

(63) Continuation-in-part of application No. 14/570,936, filed on Dec. 15, 2014, now Pat. No. 9,599,464.

(60) Provisional application No. 61/918,825, filed on Dec. 20, 2013.

(51) Int. Cl.
*G01B 11/27* (2006.01)

(52) U.S. Cl.
CPC ............ *G01B 11/272* (2013.01); *G01B 11/27* (2013.01)

(58) Field of Classification Search
CPC ............................... G01B 22/272; G01B 11/27
USPC ......... 33/227, 228, 286, 370, 371, 412, 451, 33/533, 645, DIG. 1, DIG. 21
See application file for complete search history.

(56) References Cited

U.S. PATENT DOCUMENTS

| | | | |
|---|---|---|---|
| 4,249,294 A | 2/1981 | Belfiore | |
| 5,987,762 A | 11/1999 | Toth | |
| 6,031,616 A | 2/2000 | Seiffert | |
| 6,098,297 A | 8/2000 | Belfiore | |
| 6,374,507 B1 * | 4/2002 | Lehto | G01B 11/27 33/286 |
| 6,434,841 B1 | 8/2002 | Stahl | |
| 6,704,115 B1 | 3/2004 | Hamar | |
| 6,931,738 B2 | 8/2005 | Bodgren et al. | |
| 6,968,625 B2 | 11/2005 | Segerstrom et al. | |
| 7,042,561 B1 * | 5/2006 | Andersson | G01B 5/25 356/153 |
| 8,250,770 B2 | 8/2012 | Diefenderfer | |
| D675,117 S | 1/2013 | Diefenderfer | |
| 8,416,411 B2 | 4/2013 | Ileogben | |
| 9,207,071 B2 | 12/2015 | Diefenderfer | |
| 9,285,215 B2 * | 3/2016 | Olszewski | G01B 11/272 |
| 2003/0051354 A1 | 3/2003 | Segerstrom et al. | |

(Continued)

*Primary Examiner* — R. A. Smith
*Assistant Examiner* — Tania Courson
(74) *Attorney, Agent, or Firm* — Caseiro Burke LLC; Chris A. Caseiro

(57) ABSTRACT

An alignment device to facilitate the alignment of a pulley and a sheave. The device may be used to align invention can be used in adjustable sheaves and in sheaves with multiple grooves. The device includes a laser beam generation component with a pulley contact section configured for releasable engagement with an interior surface of the groove of the pulley. The device also includes a laser beam target component with a sheave contact section configured for releasable engagement with an interior surface of the groove of the sheave. When the laser beam generation component and the laser beam target component are positioned facing one another in the pulley and sheave, respectively, the laser beam from the laser beam generation component contacts the target of the laser beam target component and wherein when the laser beam aligns with the target, the pulley and the sheave are aligned.

20 Claims, 12 Drawing Sheets

(56) References Cited

U.S. PATENT DOCUMENTS

2004/0261278 A1 12/2004 Bodgren et al.
2011/0094116 A1* 4/2011 Diefenderfer ......... F16H 57/022
　　　　　　　　　　　　　　　　　　　　　　　　33/286

* cited by examiner

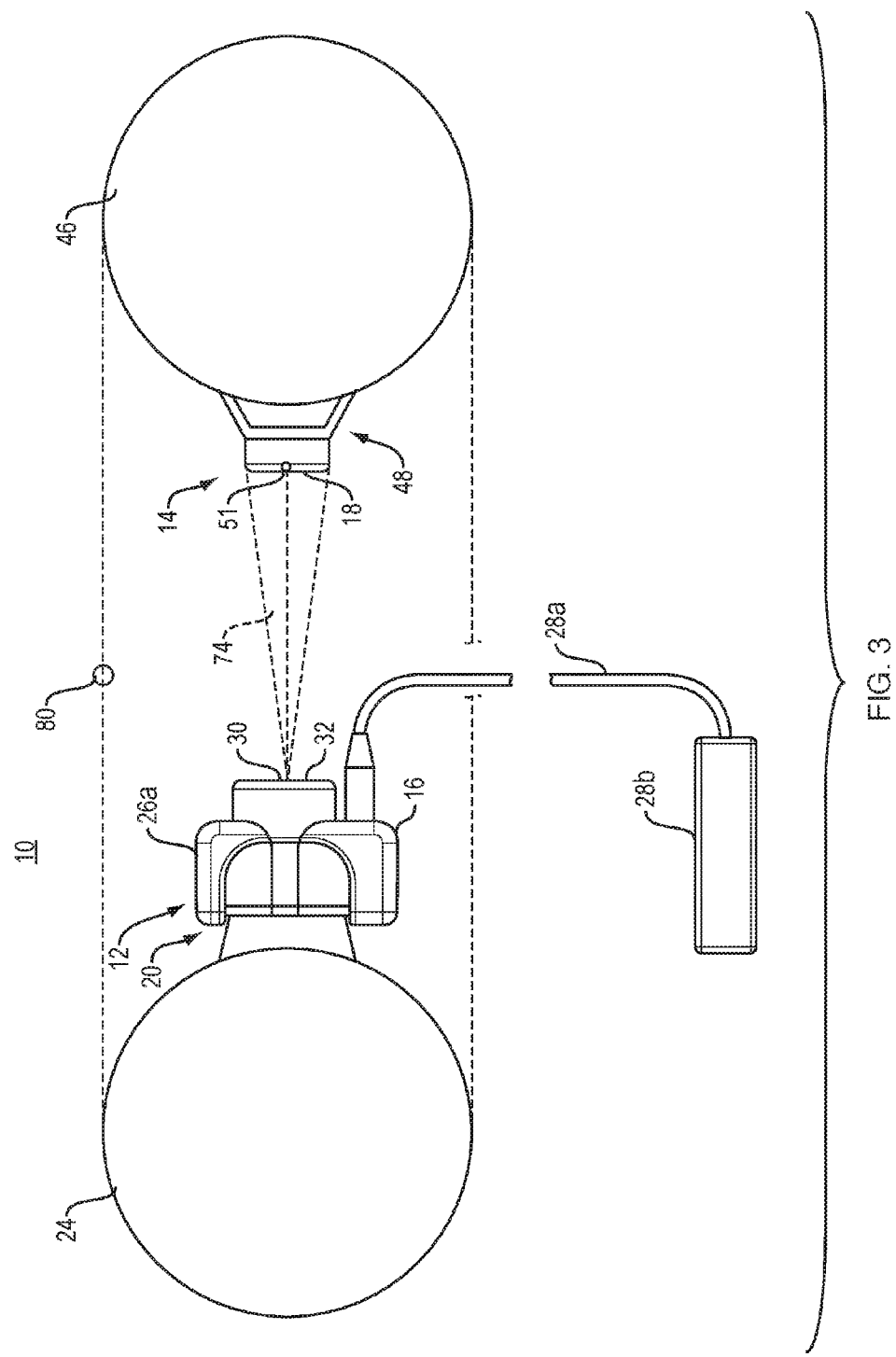

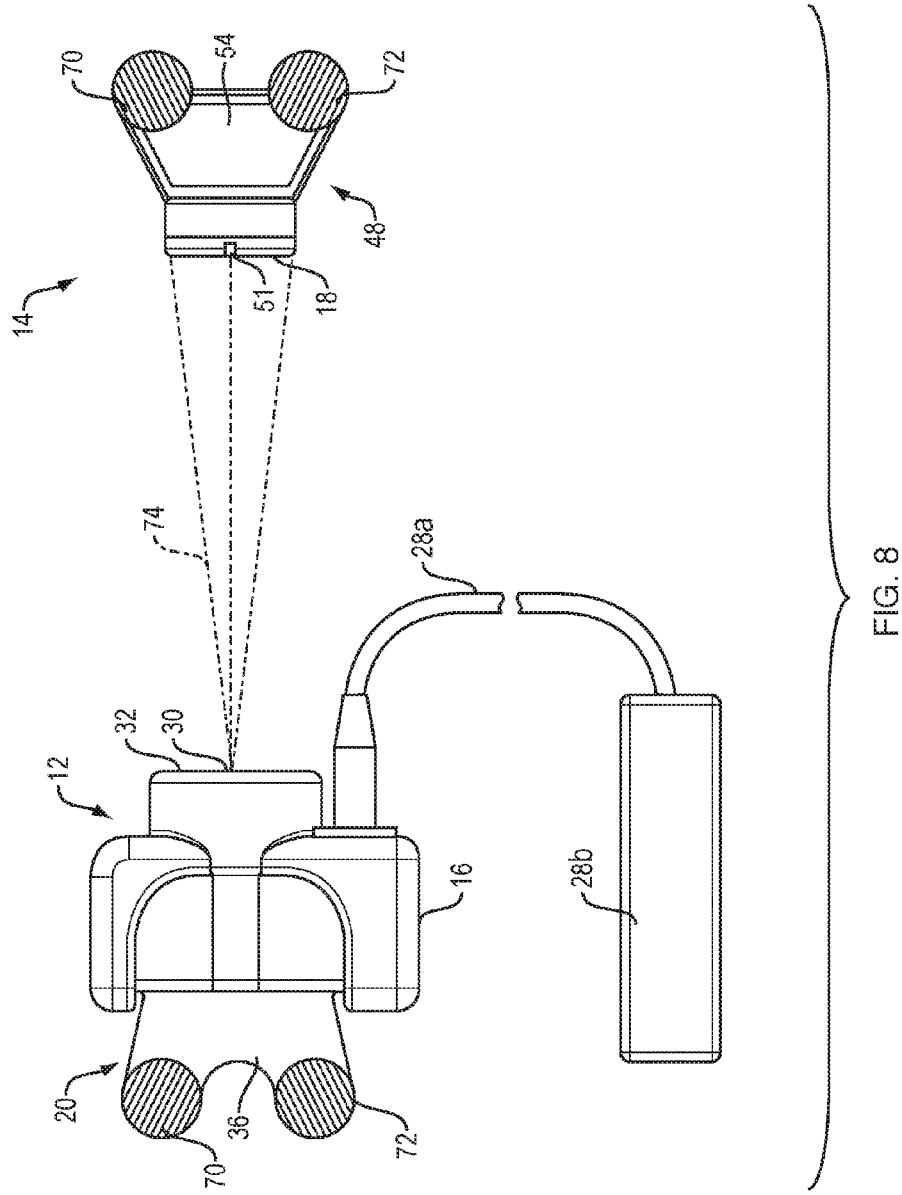

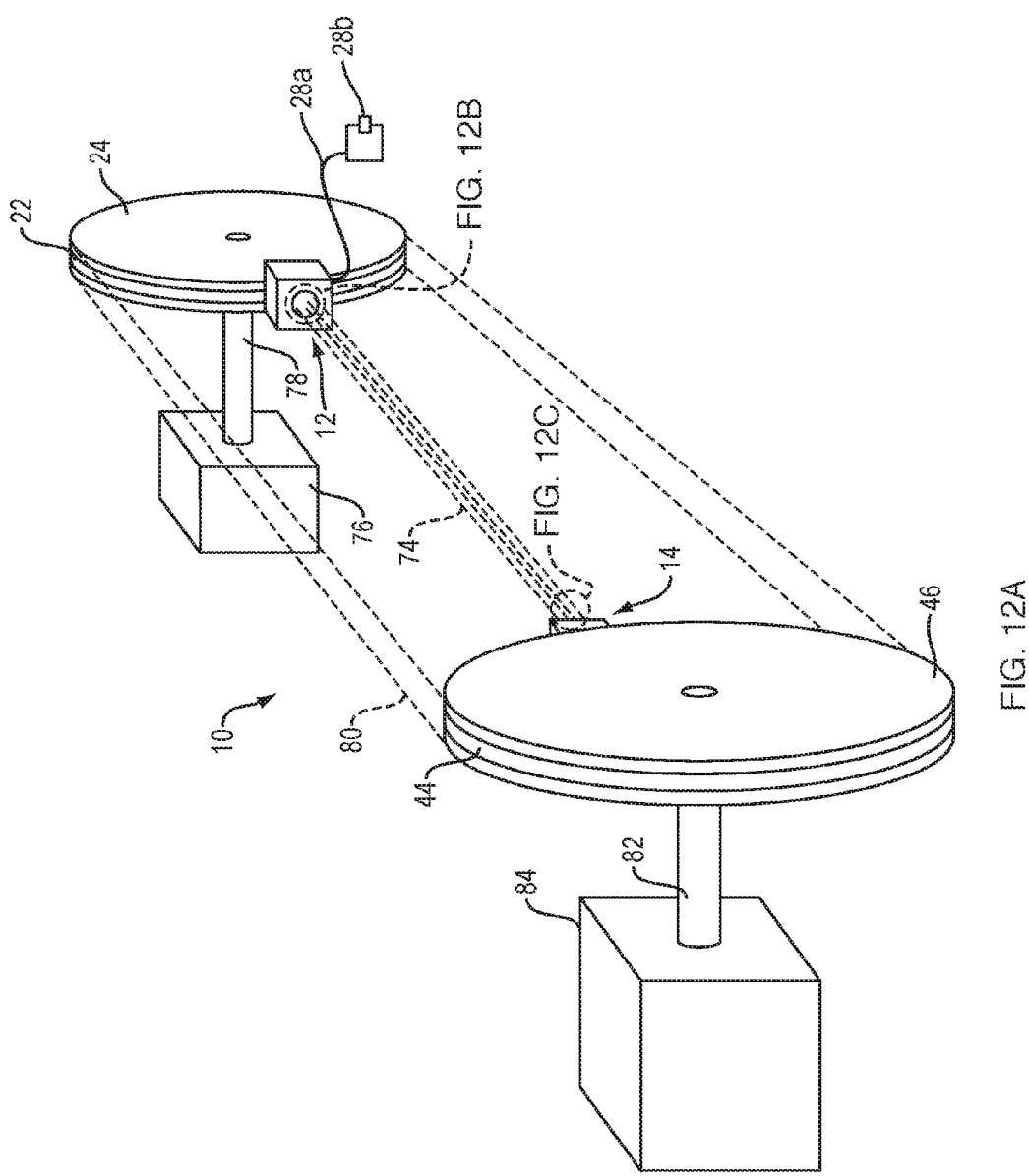

LASER DEVICE FOR PULLEY/SHEAVE ALIGNMENT

CROSS REFERENCE TO RELATED APPLICATION

The present application is a continuation-in-part of pending U.S. patent application Ser. No. 14/570,936, filed Dec. 15, 2014, of the same title and by the same inventor, which prior application is a nonprovisional and claims the priority benefit of U.S. provisional application Ser. No. 61/918,825 filed Dec. 20, 2013 of the same title and by the same inventor. The contents of the priority applications are incorporated herein by reference.

BACKGROUND OF THE INVENTION

1. Field of the Invention.

The present invention relates to devices used to align opposing pulleys/sheaves of a belt-and-pulley system. More particularly, the present invention relates to laser devices that can be used as alignment tools.

2. Description of the Prior Art.

Sheaves include grooved wheels arranged so that a pulley belt sits in the grooves. Each sheave has an outer wheel portion and an inner wheel portion spaced from one another by the grooves. The wheel portions have a rim. It is very difficult but important to align opposing sheaves so that the belt rotates smoothly with as little offset as possible so that associated equipment can perform optimally and the belt life can be extended. Current methods for establishing that alignment include: 1) simply eyeing the alignment and checking by trial-and-error and the way the equipment sounds when running; 2) for fixed sheaves, using a straight edge on the outer surfaces of the opposing sheaves; and 3) using an alignment tool such as a laser alignment.

Many of the laser alignment tools in use attach a laser generating component to the outer surface of one sheave and a receiver/reflector on the opposing sheave. When the laser output hits the receiver, alignment is believed to exist. Unfortunately, these "outside surface" alignment tools are not sufficiently effective. One example of an alignment tool that exists has two opposing components, one the laser generator and the other the receiver. It is configured for placement, likely with magnets, on the rims of the wheels rather than the outer surface. That may solve some alignment concerns but is still unsatisfactory as the proper placement of each component on the rim is critical. Moreover, it cannot be used with sheaves of adjustable width and may not be useful with sheaves with multiple grooves (that is, more than two wheel components forming the sheave).

What is needed is a device that addresses the limitations associated with existing devices for sheave alignment.

SUMMARY OF THE INVENTION

The present invention is a laser device for alignment of sheaves. It can be used for any type of sheave, including ones that are adjustable and ones that have multiple grooves. The tool has two components, one for each opposing sheave. One component is a laser beam generating component and the other is a laser beam target component. Each component is at least partially shape to enable component placement within the sheave groove. That component shape may be tapered, such as a trapezoidal shape, but is not limited thereto. This shape for placement in the sheave groove eliminates problems associated with improper placement on the outer surface or the rim. The sides include magnet components or other means for removable attachment to the grooves. A front surface of the laser beam generating component includes a laser emitter. A front surface of the laser beam target component has a target that allows for proper vertical and horizontal alignment of two or more opposing sheaves. The tool of the present invention can be used in adjustable sheaves and in sheaves with multiple grooves as it is placed within the grooves.

The invention provides a quick and simplified method to align adjustable and fixed pulley and sheave combinations primarily used for fans in the HVAC industry such as supply, return and exhaust fans, but not limited thereto. The alignment tool provides a cross-shaped laser beam attached to the shaped adapter section that fits into adjustable or fixed A or B size pulleys and sheaves.

The laser beam generating component is arranged for fixed position or removable attachment in a groove of a sheave so that, when the laser emitter is activated, a cross-shape or other spatial output will hit the target of the target component located in an opposing sheave groove. The target may be an outline of a cross or other suitable shape in the center of the target component. As noted, the laser generating piece and the target piece include shaped sections, such as trapezoidal or wedge shape sections that fit into the adjustable and fixed A and B pulleys and sheaves. Both the laser beam generating component and the laser beam target component are centered within the center of the pulley and sheave groove, regardless whether the sheave is fixed or adjustable.

The combination of the laser beam generating component and the laser beam target component can be used as a guide to properly align fan pulley/sheaves. Adjustments can be made for both pulleys and sheaves that are fastened to fan and motor shafts until the laser beam generated in a shape such as a cross is within the outline of the template that is the target, which template corresponds to the shape of the generated laser beam. For the cross-shaped beam, the target is a cross-shaped template located in the center of the target (both horizontal and vertical axis). Adjustments to the fan and/or motor sheaves are made when the laser beam cross is not properly aligned with the target cross template. A laser beam that is angled to any of the top or bottom target quadrants indicates a misalignment of the positioning of opposing sheaves, requiring adjustment of either or both of the opposing sheaves. The laser beam generating component and the laser beam target component are centered within a fixed or adjustable pulley/sheave to prove center to center alignment regardless of fixed or adjustable pulley system. The present alignment tool may be used for 1-groove, 2-groove or 3-groove adjustable/fixed pulley/sheaves.

In an embodiment of the invention, the device includes a laser beam generation component coupled to a pulley contact section that is configured for releasable engagement with an interior surface of the groove of the pulley, wherein the laser beam generation component includes a face with a portal through which a laser beam of a selected shape passes, and wherein the pulley contact section includes a unitary stalk having a single wedge at an end thereof that releasably engages the pulley contact section with the groove of the pulley, and a laser beam target component coupled to a sheave contact section configured for releasable engagement with an interior surface of the groove of the sheave, wherein the laser beam target component includes a face with a target having a shape corresponding to the shape of the selected shape of the laser beam, and wherein the sheave contact section includes a unitary stalk having a single wedge at an end thereof that releasably engages the sheave contact section with the groove of the sheave, wherein when the laser beam generation component and the laser beam target component are positioned facing one another in the pulley and sheave, respectively, the laser beam from the laser beam generation component contacts the target of the laser beam target component and wherein when the laser beam aligns with the target, the pulley and the sheave are aligned. The single wedge includes a first wedge member and a second wedge member, wherein the first wedge member and the second wedge member of the pulley contact section are spaced from one another by the end of the single stalk of the pulley contact section, wherein the single wedge of the sheave contact section comprises a first wedge member and a second wedge member, and wherein the first wedge member and the second wedge member of the sheave contact section are spaced from one another by the end of the single stalk of the sheave contact section. Each of the first wedge member and the second wedge member of the pulley contact section and the sheave contact section includes an internal wedge. The pulley contact section and the sheave contact section are each linearly adjustable and include an adjustment collar.

In an embodiment of the invention, the device includes a laser beam generation component coupled to a pulley contact section that is configured for releasable engagement with an interior surface of the groove of the pulley, wherein the laser beam generation component includes a face with a portal through which a laser beam of a selected shape passes, and wherein the pulley contact section includes a split stalk having a single wedge at an end thereof that releasably engages the pulley contact section with the groove of the pulley, and a laser beam target component coupled to a sheave contact section configured for releasable engagement with an interior surface of the groove of the sheave, wherein the laser beam target component includes a face with a target having a shape corresponding to the shape of the selected shape of the laser beam, and wherein the sheave contact section includes a split stalk having a single wedge at an end thereof that releasably engages the sheave contact section with the groove of the sheave, wherein when the laser beam generation component and the laser beam target component are positioned facing one another in the pulley and sheave, respectively, the laser beam from the laser beam generation component contacts the target of the laser beam target component and wherein when the laser beam aligns with the target, the pulley and the sheave are aligned. The single wedge of the pulley contact section comprises a first wedge member and a second wedge member, wherein the first wedge member and the second wedge member of the pulley contact section are spaced from one another by the end of the split stalk of the pulley contact section, wherein the single wedge of the sheave contact section comprises a first wedge member and a second wedge member, and wherein the first wedge member and the second wedge member of the sheave contact section are spaced from one another by the end of the split stalk of the sheave contact section, and wherein each of the first wedge member and the second wedge member of the pulley contact section and the sheave contact section includes an internal wedge. The pulley contact section and the sheave contact section are each linearly adjustable and each includes an adjustment collar. The split stalk of each of the pulley contact section and the sheave contact section includes a first plank and a second plank, and wherein the first plank and the second plank are curved outwardly to expand the single wedge so that it presses against the grooves of the pulley for the pulley contact section and against the grooves of the sheave for the sheave contact section. The single wedge of the pulley contact section comprises a first wedge member and a second wedge member, wherein the first wedge member is coupled to the first plank of the pulley contact section, the second wedge member is coupled to the second plank of the pulley contact section, wherein the single wedge of the sheave contact section comprises a first wedge member and a second wedge member, wherein the first wedge member is coupled to the first plank of the sheave contact section, and the second wedge member is coupled to the second plank of the split stalk of the sheave contact section.

The present invention provides an easier, faster and more certain way of establishing sheave alignment. This advantage is further shown in the following detailed description, accompanying drawings and appended claims.

BRIEF DESCRIPTION OF THE DRAWINGS

FIG. 3 is a side view of the alignment device of the present invention represented in FIGS. 1A through 2B.

FIG. 8 is a side view of the laser beam generation component and the laser beam target component shown removed from the sheaves for either sheave size.

FIG. 12A is a perspective view of the alignment device of the present invention in operation. FIG. 12B is a front view of the laser beam portal. FIG. 12C is a front view of the laser beam target.

DETAILED DESCRIPTION OF THE INVENTION

Figure 1A:
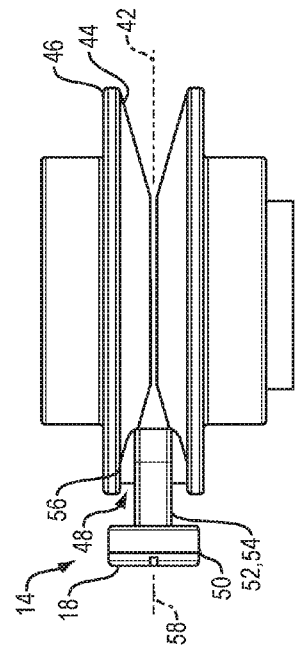
FIG. 1A is a top view of the alignment device of the present invention, showing the laser beam generation component positioned in a groove of a first sheave.
Figure 1B:
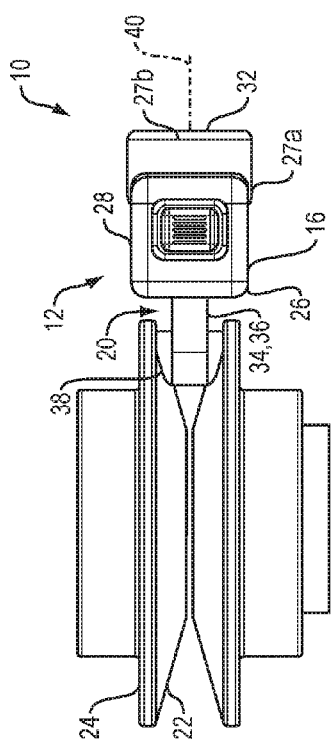
FIG. 1B is a top view of the laser beam target component positioned in a groove of an opposing second sheave for B size sheaves.
Figure 2A:
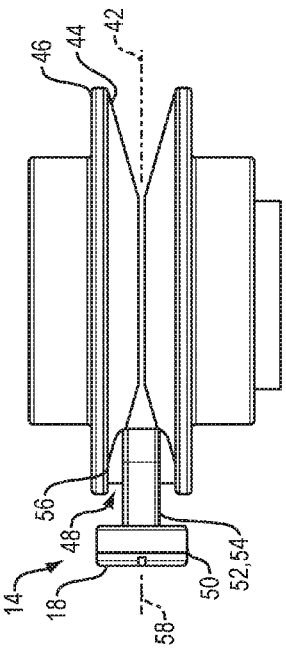
FIG. 2A is a top view of the alignment device of the present invention, showing the laser beam generation component positioned in a groove of a first sheave.
Figure 2B:
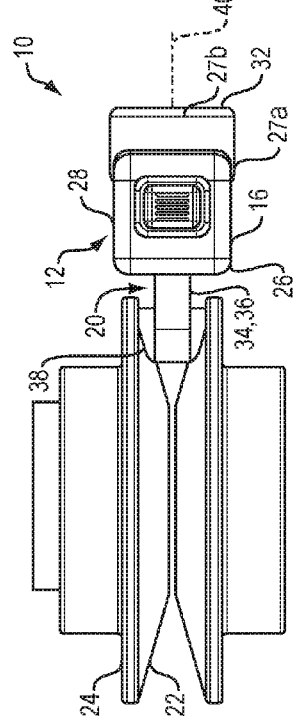
FIG. 2B is a top view of the laser beam target component positioned in a groove of an opposing second sheave for A size sheaves.
Figure 4:
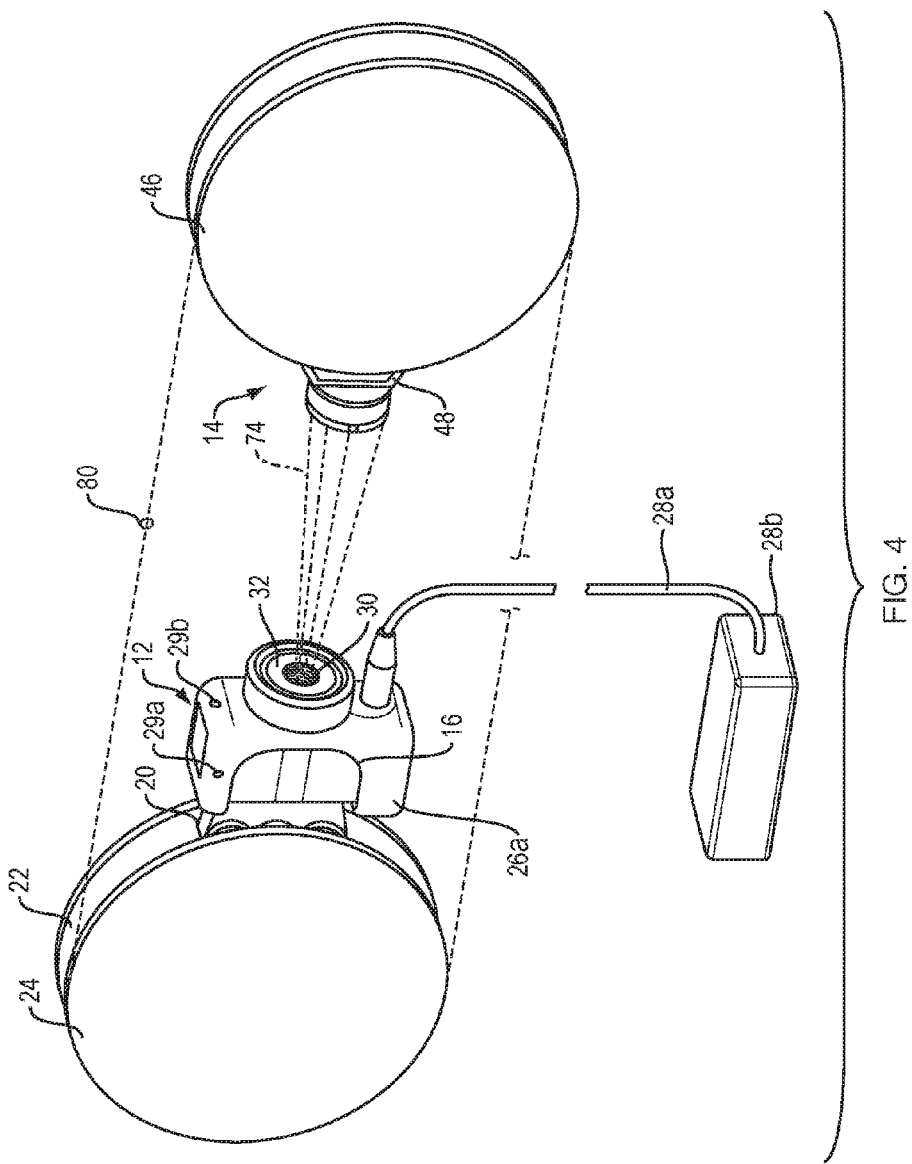
FIG. 4 is a perspective of the alignment device of the present invention represented in FIGS. 1A through 2B looking toward the laser beam generation component.
Figure 5:
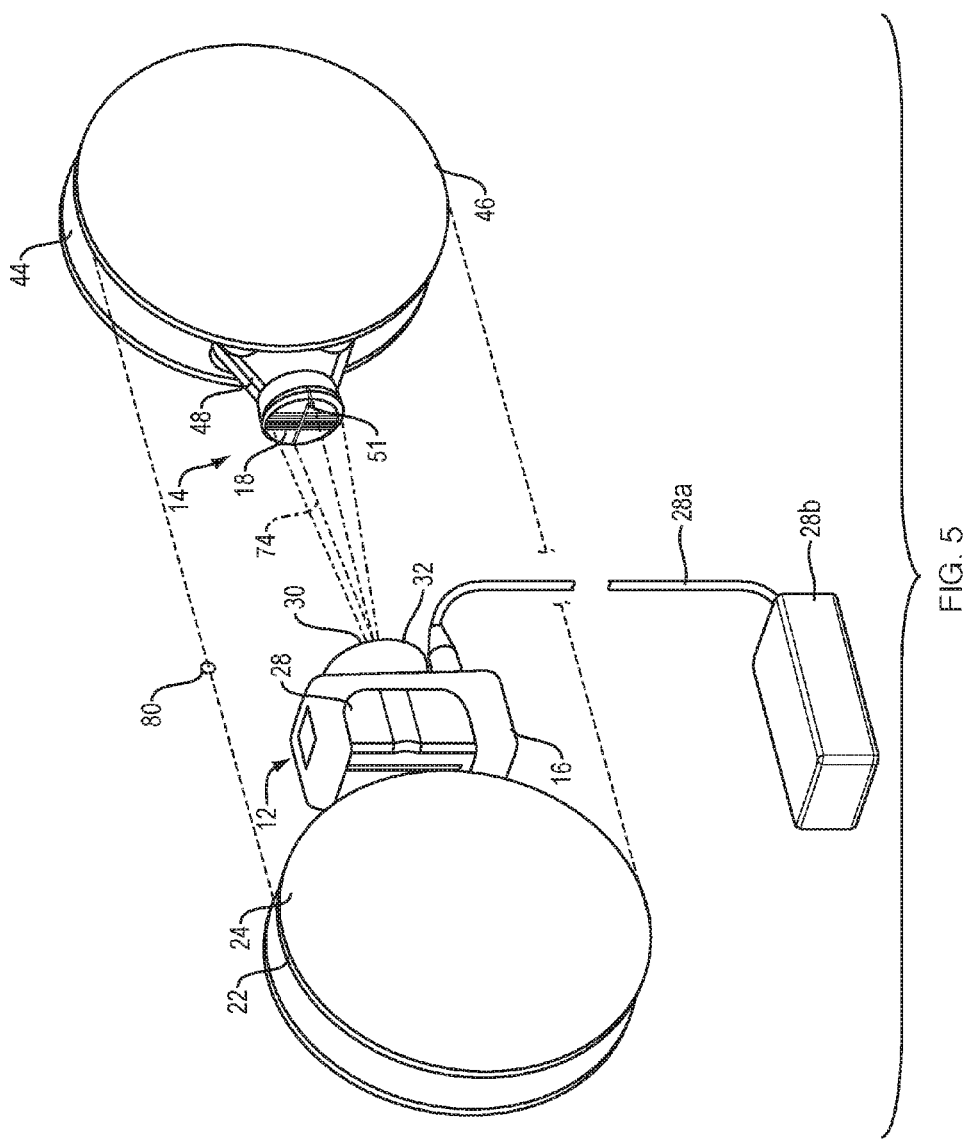
FIG. 5 is a perspective of the alignment device of the present invention represented in FIGS. 1A through 2B looking toward the laser beam target component.
Figure 6A:
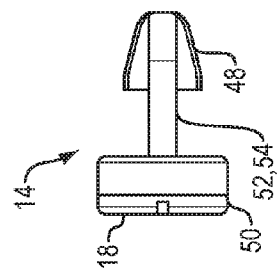
FIG. 6A is a top view of the laser beam generation component used for B size sheaves shown removed from the sheaves.
Figure 6B:
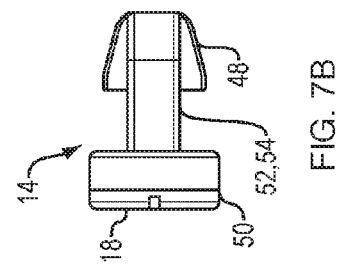
FIG. 6B is a top view of the laser beam target component used for B size sheaves shown removed from the sheaves.
Figure 7A:
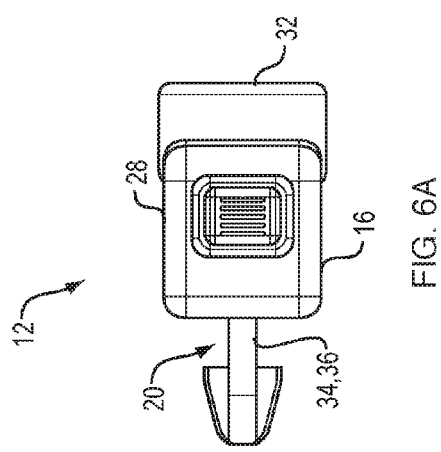
FIG. 7A is a top view of the laser beam generation component used for A size sheaves shown removed from the sheaves.
Figure 7B:
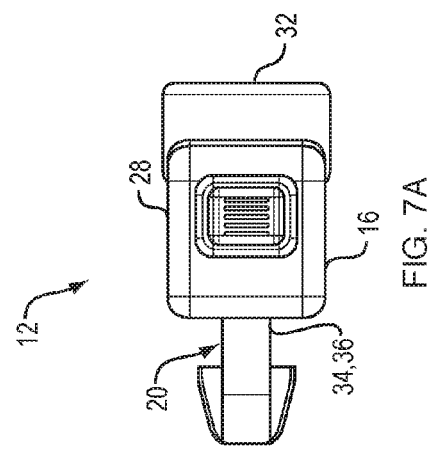
FIG. 7B is a top view of the laser beam target component used for A size sheaves shown removed from the sheaves.
Figure 9:
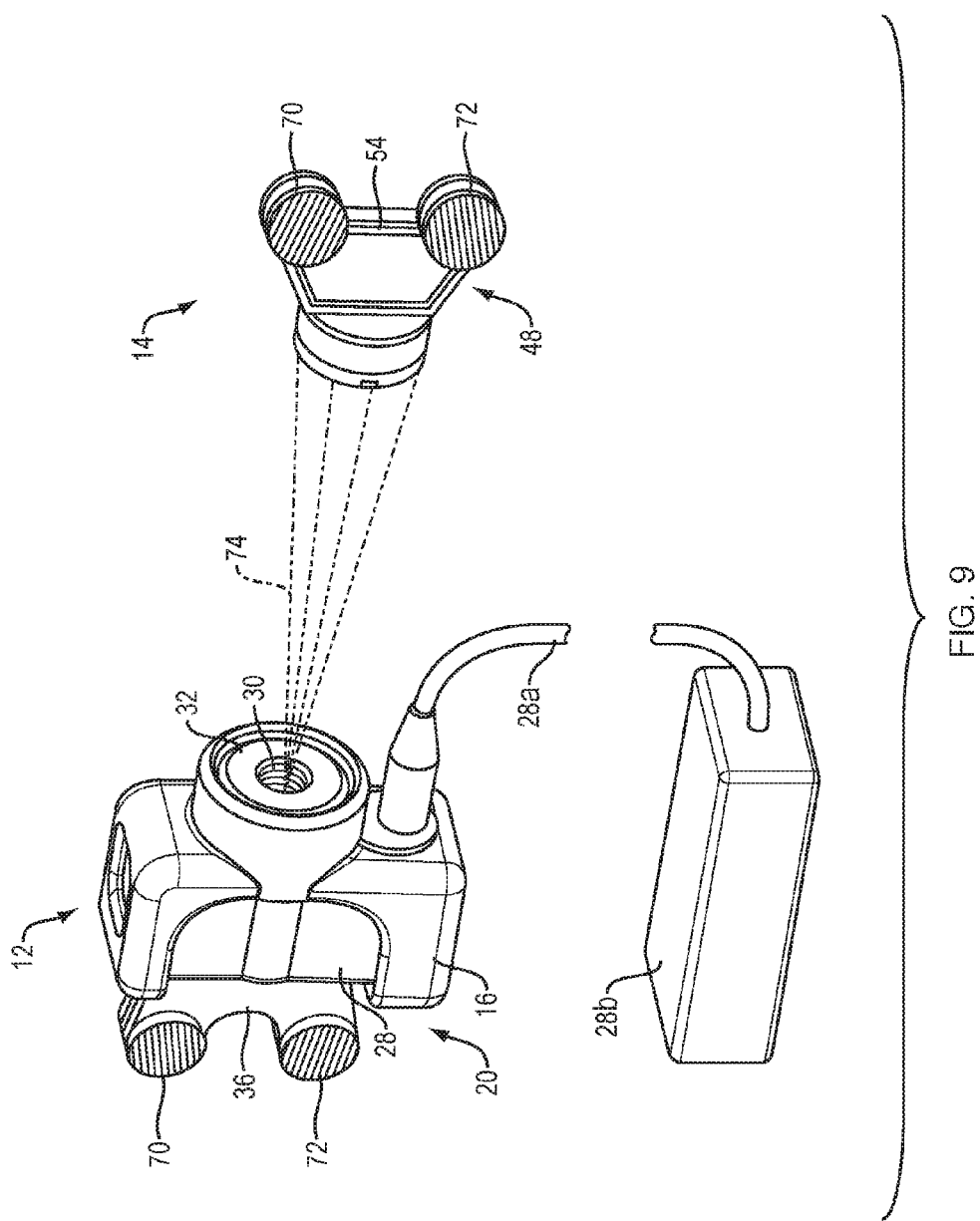
FIG. 9 is a perspective view of the laser beam generation component and the laser beam target component looking toward the laser beam generation component.
Figure 10:
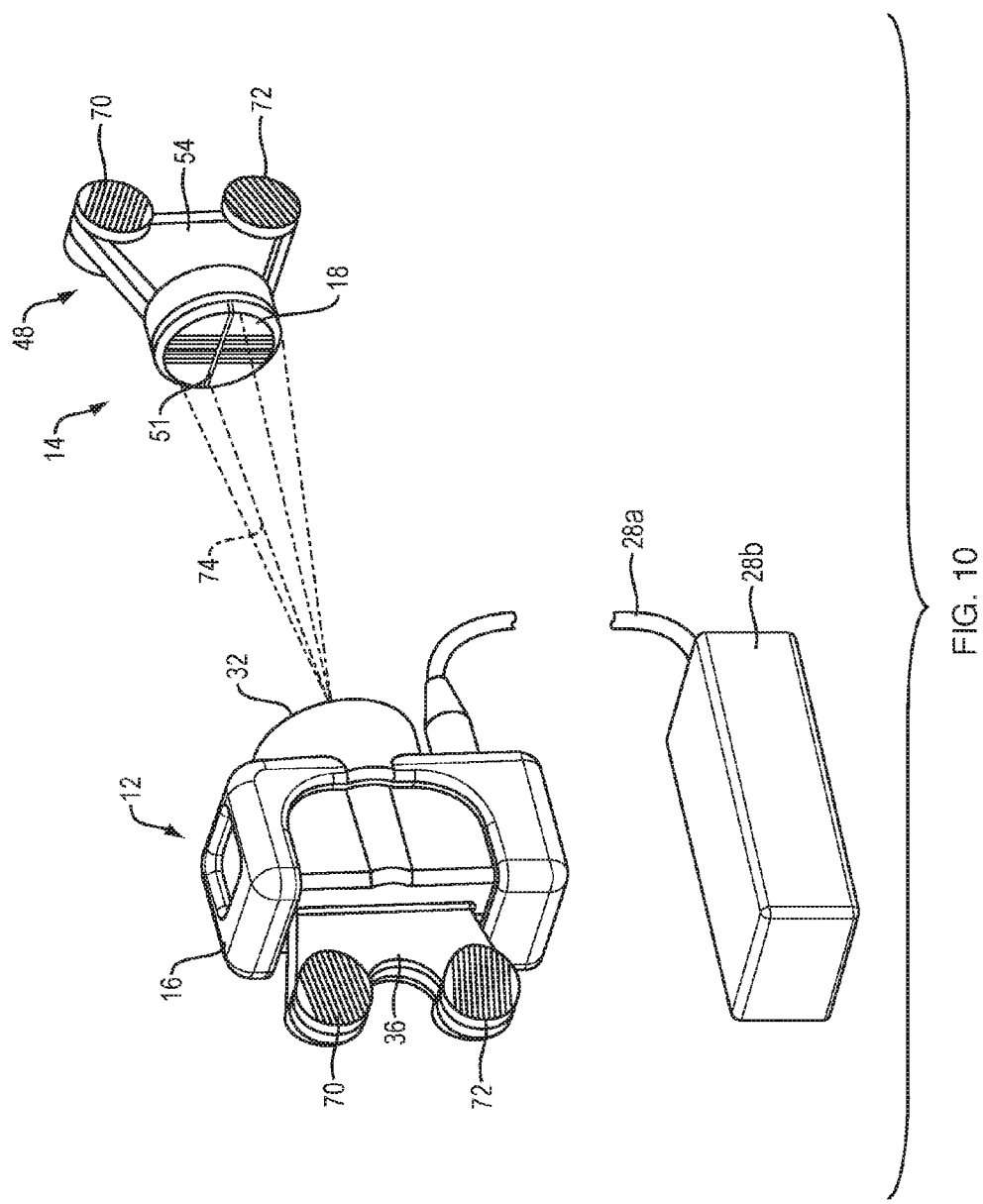
FIG. 10 is a perspective view of the laser beam generation component and the laser beam target component looking toward the laser beam target component.

An alignment device 10 of the present invention is shown in the Figures. The alignment device 10 shown in FIGS. 1A and 1B and 6A and 6B is specifically of a size used in connection with B size sheaves, while the alignment device 10 of FIGS. 2A and 2B and 7A and 7B is specifically of a size used in connection with A size sheaves. That is, the sheave groove interface portion of the alignment device 10 is sized and shaped to fit into grooves sized and shaped in accordance with those sheave sizes. In all other respects regarding the laser generating and target portions of the alignment device 10, the two versions are the same.

The alignment device 10 includes a laser beam generation component 12 and a laser beam target component 14. The generation component 12 and the target component 14 are arranged to face one another when in use. The generation component 12 includes a laser emitter component 16 that generates a laser beam of selectable shape. The target component 14 includes a face 18 that the laser beam contacts when the device 10 is in use.

The generation component 12 further includes a pulley contact section 20 that is configured to engage with a groove 22 of a pulley 24 of a particular size, such as A or B size. For purposes of describing the present invention, the terms "pulley" and "sheave" may be used interchangeably. That is, the laser beam generation component 12 may be removably affixed to a pulley groove or a sheave groove without deviating from the invention. The pulley contact section 20 is fixedly connected to the laser emitter component 16. Optionally, the pulley contact section 20 may be separably engaged with the laser emitter component 16. The laser emitter component 16 includes a housing 26, a laser emitter 28 and a laser beam output portal 30. The housing 26 may be fabricated of a suitable material, such as a plastic, but not limited thereto. The housing 26 may be of a substantially square shape, as shown, or it may be of a different shape, such as to reduce the overall weight of the laser beam generation component 12. The housing 26 may include a cover structure 26a, as shown. Alternatively, the cover structure 26a may be omitted to reduce the overall weight of the housing 26. The laser emitter 28 may be a DRM509-L0014 650 nm 5 mW laser cross module available from Instaspark of Santa Fe Springs, Calif. The laser beam output portal 30 is an opening in a front face 32 of the housing 26.

The portal 30 is arranged to allow passage of a laser beam of selectable shape. The laser beam shape may be a cross shape, for example. The housing 26 includes a power source compartment 27a with a cover 27b. The laser emitter 28 of the device 10 may be powered by a battery pack removably located within the power source compartment 27a or it may be powered by a supply cable 28a that is coupled to a separate battery pack 28b that includes a separate battery pack and/or may be plugged into a power supply outlet. The battery pack 28b can be removably attached or permanently attached to the laser emitter 28 by supply cable 28a. If permanently attached, a lighter gauge wire can be used to supply power to the laser emitter 28. The housing 26 further includes a first laser alignment set screw 29a and a second laser alignment set screw 29b, each of which may be used separately or jointly to provide for calibration alignment of the laser beam output. A calibration tool may be used to calibrate laser alignment before the alignment device 10 is used to align the pulley 24 and a sheave 46.

The housing 26 may be connected to the pulley contact section 20 with a connector 34, which includes a stalk 36 that causes the laser beam emitter component 16 to be spaced away from the pulley 24. The pulley contact section 20 may be wedge shaped to enhance contact engagement with interior surfaces 38 of the groove 22 of the pulley 24. For example, the pulley contact section 20 may include a magnet or set of magnets on or within the exterior surface of the pulley contact section 20 so that the laser beam generation component 12 may be releasably engaged with the pulley 24 in a way that aids to align a centerline 40 of the laser beam generation component 12 with a centerline 42 of the groove 22 of the pulley 24. Establishing such alignment helps in the process of alignment of the groove 22 of the pulley 24 with a groove 44 of the sheave 46, which may be a motor sheave.

The target component 14 further includes a sheave contact section 48 that is configured to engage with the groove 44 of the sheave 46. For purposes of describing the present invention as noted above, the terms "sheave" and "pulley" may be used interchangeably. That is, the target component 14 may be removably affixed to a pulley groove or a sheave groove without deviating from the invention. The sheave contact section 48 is fixedly connected to a target housing 50. Optionally, the sheave contact section 48 may be separably engaged with the target component 14. The target housing 50 may be fabricated of a suitable material, such as a plastic, but not limited thereto. The target housing 50 includes the face 18 that "receives" the laser beam from the laser beam generation component 12. The face 18 includes a grid, pattern or other type of appearance that defines a target 51 that can be used to determine the alignment of the pulley 24 with the sheave 46. The pattern on the face 18 may correspond to the shape of the laser beam emitted by the laser beam generation component 12. The pattern may be a cross shape, for example. In that way, certainty of alignment is determined when the laser beam pattern fits in the target shape. If they two do not align, the position of either or both of the pulley 24 and the sheave 46 may be adjusted until the beam and target pattern are in alignment.

The housing 50 may be connected to the sheave contact section 48 with a connector 52, which includes a stalk 54 that causes the housing 50 to be spaced away from the sheave 46. The sheave contact section 48 may be wedge shaped to enhance contact engagement with interior surfaces 56 of the groove 44 of the sheave 46. For example, the sheave contact section 48 may include a magnet or set of magnets on or within the exterior surface of the sheave contact section 48 so that the laser beam target component 14 may be releasably engaged with the sheave 46 in a way that aids to align a centerline 58 of the target 51 with a centerline 60 of the groove 44 of the sheave 46. Establishing such alignment helps in the process of alignment of the groove 44 of the sheave 46 with the groove 22 of the pulley 24.

It is to be noted that the laser beam generation component 12 may be modular in that it can be formed of two separable elements, the laser beam emitter component 16 and the pulley contact section 20. For example, a rear section of the laser beam generation component 16 may include a retaining slot arranged to receive therein an engagement flange of the pulley contact section 20. With this type of module design, the laser beam generation component 12 may be maintained separately, such that the laser emitter 28 may be repaired or replaced as desired without requiring the replacement of an entire one of the laser beam generation component 16. It is to be noted that the laser beam target component 14 may also be modular, with a separate sheave contact section and a target housing component similar in nature to that of the laser beam generation component 12. Further, the pulley contact section and the sheave contact section may be of the same form and interchangeable with respect to the particular housing to which they are removably joined. In that way, an interchangeable common contact section may be used for the laser beam generation component 12 and the laser beam target component 14.

The pulley contact section 20 and the sheave contact section 48 are both shown in the Figures as arcuate configurations comprising a first wedged body 70 and a second wedged body 72, which are connected together by stalk 36/54. This configuration provides stability and limited chance of disengagement or misalignment of the laser beam generation component 12 or the laser beam target component 14 in their respective grooves 22/44. It is to be understood that other configurations are possible for securing the components in the grooves in an aligned manner. For example, but not limited thereto, the pulley contact section 20, the sheave contact section 48 and, more generally, the laser beam generation component 12 and the laser beam target component 14 may be optimized to maintain structural integrity while reducing overall weight, such as by streamlining one or more components, using lightweight materials with sufficient structural integrity. The configurations of those components represented in the figures are examples of suitable constructions but they are not limited thereto.

Figure 11A:
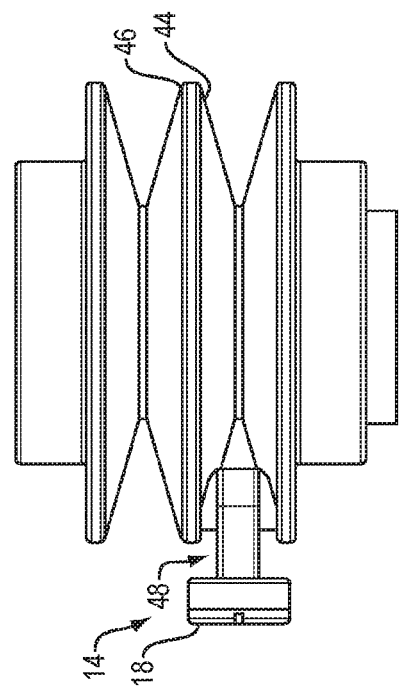
FIG. 11A is a top view of a two-groove sheave including laser beam generation component of the present invention, suitable for a two-groove A sheave or a two-groove B sheave.
Figure 11B:
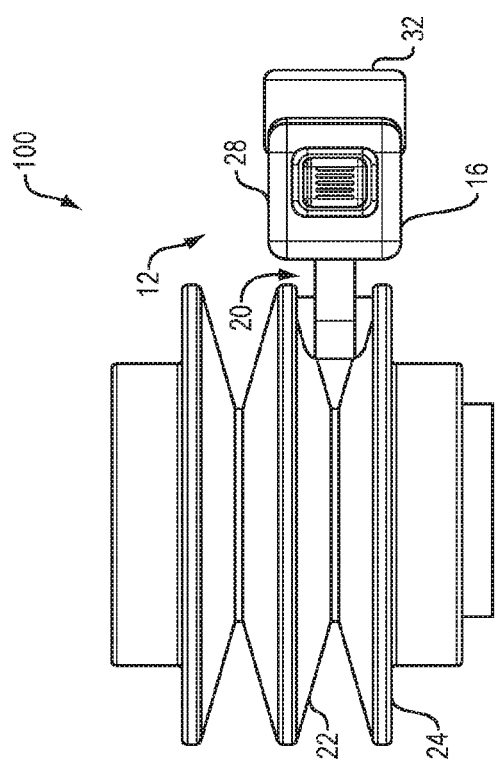
FIG. 11B is a top view of a two-groove sheave including the laser beam target component, suitable for a two-groove A sheave or a two-groove B sheave.

FIG. 11A shows the laser beam generation component 12 of the present invention used in connection with a two-groove pulley and sheave system 100. FIG. 11B shows the laser beam target component 14 of the present invention used in connection with a two-groove pulley and sheave system 100. For such a system, the laser beam generation component 12 and the laser beam target component 14 are to be placed in respective corresponding grooves rather than across grooves. In all other respects, the alignment device 10 may be used in the same way as noted with respect to a one-groove pulley and sheave system.

As shown in FIG. 12A, which depicts a plural-groove pulley and sheave system, the alignment device 10 of the present invention enables the proper and relatively easy alignment of the pulley 24 and the opposing sheave 46. The laser beam generation component 12 is removably engaged with the groove 22 of the pulley 24. The laser beam target component 14 is removably engaged with the groove 44 of the sheave 46. The laser emitter 28 of the laser beam emitter component 16 is activated by an operator, such as by pushing a button or moving a switch, either of which may be located on the battery pack 28b, and a laser beam 74 of desired shape is emitted through the portal 30 of the front face 32 of the emitter component 16 toward the laser beam target component 14. The laser beam 74 contacts the target 51 on the face 18 of the target component 14. The operator observes the beam 74 on the target 51 and determines whether the laser beam shape aligns with the target shape. If so, the alignment device 10 may be removed and pulley motor 76 may be activated to cause movement of pulley shaft 78, which causes movement of belt 80. That, in turn, moves sheave 46 and associated sheave shaft 82 for operation of equipment such as fan 84. If the beam 74 is not aligned in the target 51, the operator may adjust positioning of either or both of the pulley 24 and the sheave 46 and repeat the process until such time as alignment is established.

Also as shown in FIG. 12A and 12C, the target 51 may include a grid 86 that represents the extent of misalignment, wherein increments of spacing of the grid 86 may be used by the operator to determine the amount of adjustment required and in which quadrant adjustment is required to establish alignment. For example only, an increment of one in the upper left quadrant of the grid 86 may correspond to a need to adjust the pulley 24 one inch downwardly and to the right. Other arrangements to facilitate specific adjustments to be made are possible using the alignment device 10.

Figure 14:
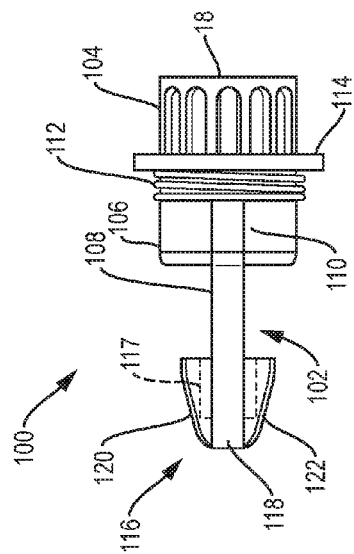
FIG. 14 is a top view of the first alternative embodiment of the laser beam target component of FIG. 13.
Figure 13:
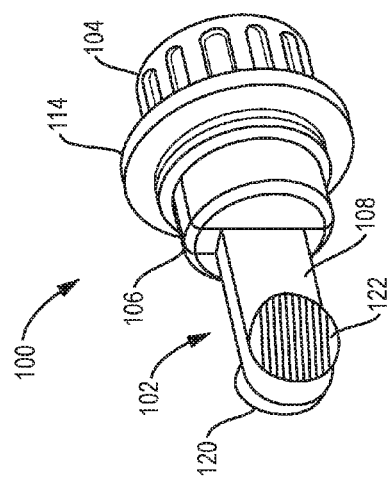
FIG. 13 is a rear perspective view of a first alternative embodiment of the laser beam target component with a unitary stalk for the sheave contact section.

Alternative configurations of the alignment device of the present invention includes alternative embodiments of the laser beam target component and the laser beam generation component. A first embodiment of an alternative laser beam target component 100 is shown in FIGS. 13 and 14. The target component 100 includes a sheave contact section 102 that is configured to engage with the groove of the sheave as previously illustrated in FIG. 6 with respect to target component 14. The target component 100 may be removably affixed to a pulley groove or a sheave groove without deviating from the invention. The sheave contact section 102 is connected to target housing 104 through target base 106. The target housing 104 may be fabricated of a suitable material, such as a plastic, but not limited thereto, and it may be knurled or otherwise textured to facilitate its rotation if desired. The target housing 104 includes the face 18 that "receives" the laser beam from the laser beam generation component as described herein. The face 18 includes a grid, pattern or other type of appearance that defines a target that can be used to determine the alignment of the pulley with the sheave. The pattern on the face 18 may correspond to the shape of the laser beam emitted by the laser beam generation component. The pattern may be a cross shape, for example. In that way, certainty of alignment is determined when the laser beam pattern fits in the target shape. If the two do not align, the position of either or both of the pulley and the sheave may be adjusted until the beam and target pattern are in alignment.

The sheave contact section 102 includes a unitary stalk 108 that is connected to an interior 110 of the target base 106 in a manner that permits the user to adjust internally the linear displacement of the sheave contact section 102 such as by threading the unitary stalk 108 and the interior 110 so that the unitary stalk may be moved in and out of the target base 106. An exterior section 112 of the target base 106 may also be threaded to enable linear movement of the target housing 104 with respect thereto using adjustment ring 114. The sheave contact section 102 further includes single wedge 116 at end 118 of the unitary stalk 108. The single wedge 116 includes a first wedge member 120 and a second wedge member 122. The wedge members 120/122 are of a wedge shape so that the sheave contact section 102 may be inserted into the groove of the sheave and establish a tight friction fit of the laser beam target component 100 therein. Internal wedge 117 provides backing force to enhance and maintain the frictional fit established with the single wedge 116. Surfaces of the wedge members 120/122 may be textured or otherwise modified to enhance that friction fit. The adjustability of the linear position of the unitary stalk 108 allows for further securing of the sheave contact section 102 in the groove of the sheave. This embodiment of the laser beam target component 100 reduces the number of components required. This configuration also provides stability and limited chance of disengagement or misalignment of the laser beam target component 100 when positioned for use.

Figure 16:
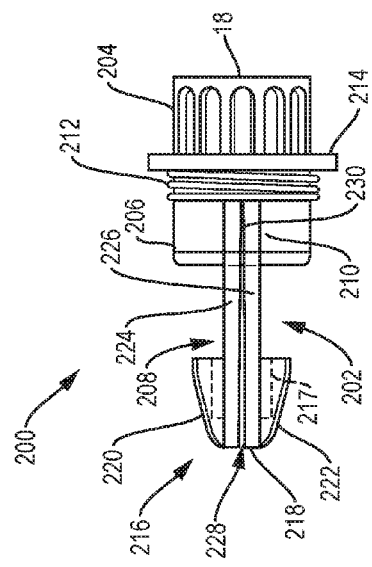
FIG. 16 is a top view of the second alternative embodiment of the laser beam target component of FIG. 15.
Figure 15:
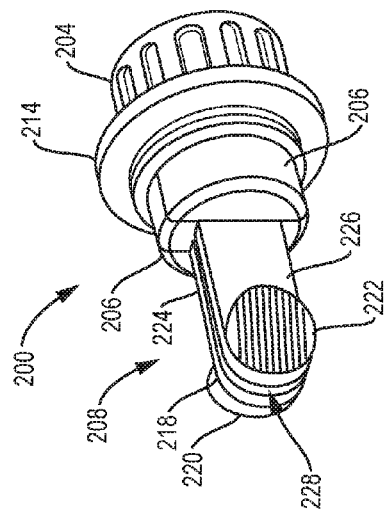
FIG. 15 is a rear perspective view of a second alternative embodiment of the laser beam target component with a split stalk for the sheave contact section.

A second embodiment of an alternative laser beam target component 200 is shown in FIGS. 15 and 16. The target component 200 includes a sheave contact section 202 that is configured to engage with the groove of the sheave as previously illustrated in FIG. 6 with respect to target component 14. The target component 200 may be removably affixed to a pulley groove or a sheave groove without deviating from the invention. The sheave contact section 202 is connected to target housing 204 through target base 206. The target housing 204 may be fabricated of a suitable material, such as a plastic, but not limited thereto, and it may be knurled or otherwise textured to facilitate its rotation if desired. The target housing 204 includes the face 18 that "receives" the laser beam from the laser beam generation component as described herein. The face 18 includes a grid, pattern or other type of appearance that defines a target that can be used to determine the alignment of the pulley with the sheave. The pattern on the face 18 may correspond to the shape of the laser beam emitted by the laser beam generation component. The pattern may be a cross shape, for example. In that way, certainty of alignment is determined when the laser beam pattern fits in the target shape. If the two do not align, the position of either or both of the pulley and the sheave may be adjusted until the beam and target pattern are in alignment.

The sheave contact section 202 includes a split stalk 208 that is connected to an interior 210 of the target base 206 in a manner that permits the user to adjust internally the linear displacement of the sheave contact section 202 such as by threading the split stalk 208 and the interior 210 so that the split stalk 208 may be moved in and out of the target base 206. An exterior section 212 of the target base 206 may also be threaded to enable linear movement of the target housing 204 with respect thereto using adjustment ring 214. The sheave contact section 202 further includes single wedge 216 at end 218 of the split stalk 208. The single wedge 216 includes a first wedge member 220 and a second wedge member 222. The wedge members 220/222 are of a wedge shape so that the sheave contact section 202 may be inserted into the groove of the sheave and establish a tight friction fit of the laser beam target component 200 therein. Internal wedge 217 provides backing force to enhance and maintain the frictional fit established with the single wedge 216. Surfaces of the wedge members 220/222 may be textured or otherwise modified to enhance that friction fit.

The split stalk 208 includes first stalk plank 224 and second stalk plank 226. Planks 224/226 are slightly curved outwardly so that at first end 228 they extend slightly apart as compared to their proximity at second end 230. This slightly outward curvature of the first stalk plank 224 and the second stalk plank 226 causes the wedge members 220/222 to extend outwardly and, as a result, increase the outwardly applied pressure of the sheave contact section 202 as the wedge members 220/222 move into the interior of the grooves of the sheave. The adjustability of the linear position of the split stalk 208 enables that movement of the sheave contact section 202 into the groove of the sheave. That is, when the split stalk 208 is moved in the direction of first end 228 by rotating adjustment ring 214 toward first end 228 so as to hold planks 224/226 down and thereby applying pressure to the wedge members 220/222, thereby holding the sheave contact section 202 in place, and wedge members 220/222 engage the groove of the sheave, the predisposed outward curvature of the planks 224/226 increases the pressure or force supplied by the wedge members 220/222 in the engagement with the sheave groove so as to enhance the frictional contact between the laser beam target component 200 and the sheave. The frictional contact may also be referred to as pressure contact, pressure fit, pressure engagement or frictional engagement with the same purpose of releasably engaging or releasably securing the sheave contact section 202 in the groove of the sheave without the need to bond or otherwise mechanically couple the sheave contact section 202 to the groove of the sheave. This configuration also provides stability and limited chance of disengagement or misalignment of the laser beam target component 200 when positioned for use.

Figure 17:
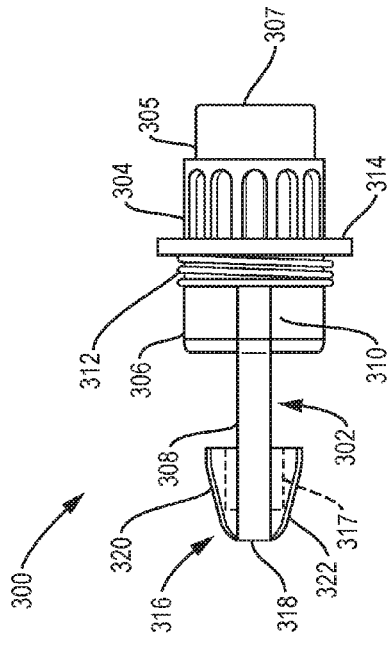
FIG. 17 is a rear perspective view of a first alternative embodiment of the laser beam generation component with a unitary stalk for the pulley contact section.
Figure 18:
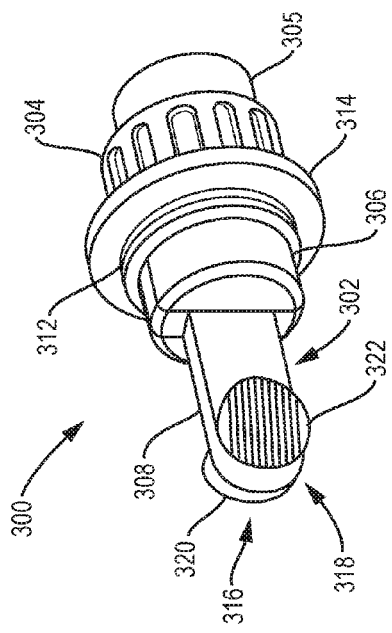
FIG. 18 is a top view of the first alternative embodiment of the laser beam generation component of FIG. 17.

A first embodiment of an alternative laser beam generation component 300 is shown in FIGS. 17 and 18. The generation component 300 includes a pulley contact section 302 that is configured to engage with the groove of the pulley as previously illustrated in FIG. 6 with respect to generation component 12. The generation component 300 may be removably affixed to a pulley groove or a sheave groove without deviating from the invention. The pulley contact section 302 is connected to laser beam generator housing 304 through generator base 306. The generator housing 304 includes laser emitter component 305 that includes a laser emitter therein and a laser beam output portal 307. The housing 304 may be fabricated of a suitable material, such as a plastic, but not limited thereto. The housing 304 may be of a substantially square shape, as shown, or it may be of a different shape, such as to reduce the overall weight of the laser beam generation component 300. The laser emitter may be a DRM509-L0014 650 nm 5 mW laser cross module available from Instaspark of Santa Fe Springs, Calif. The laser beam output portal 307 is an opening in a front face of the housing 304. The portal 307 is arranged to allow passage of a laser beam of selectable shape. The laser beam shape may be a cross shape, for example. Wiring for powering the laser emitter pass through the housing 304 to a power supply.

The pulley contact section 302 includes a unitary stalk 308 that is connected to an interior 310 of the generator base 306 in a manner that permits the user to adjust internally the linear displacement of the pulley contact section 302 such as by threading the unitary stalk 308 and the interior 310 so that the unitary stalk may be moved in and out of the generator base 306. An exterior section 312 of the generator base 306 may also be threaded to enable linear movement of the generator housing 304 with respect thereto using adjustment ring 314. The pulley contact section 302 further includes single wedge 316 at end 318 of the unitary stalk 308. The single wedge 316 includes a first wedge member 320 and a second wedge member 322. The wedge members 320/322 are of a wedge shape so that the pulley contact section 302 may be inserted into the groove of the pulley and establish a tight friction fit of the laser beam generation component 300 therein. Internal wedge 317 provides backing force to enhance and maintain the frictional fit established with the single wedge 316. Surfaces of the wedge members 320/322 may be textured or otherwise modified to enhance that friction fit. The adjustability of the linear position of the unitary stalk 308 allows for further securing of the pulley contact section 302 in the groove of the pulley. This embodiment of the laser beam generation component 300 reduces the number of components required. This configuration also provides stability and limited chance of disengagement or misalignment of the laser beam generation component 300 when positioned for use.

Figure 19:
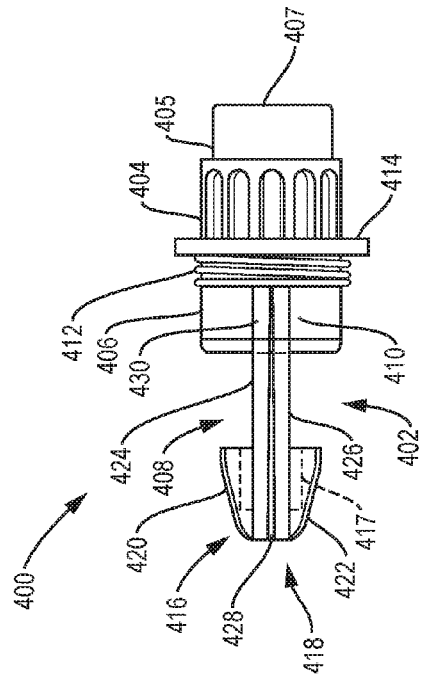
FIG. 19 is a rear perspective view of a second alternative embodiment of the laser beam generation component with a split stalk for the pulley contact section.
Figure 20:
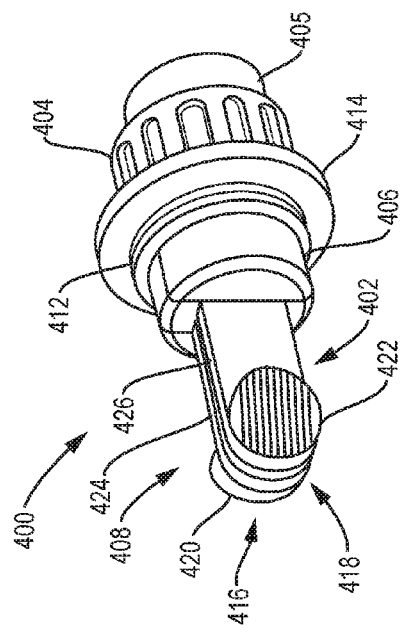
FIG. 20 is a top view of the second alternative embodiment of the laser beam generation component of FIG. 19.

A second embodiment of an alternative laser beam generation component 400 is shown in FIGS. 19 and 20. The generation component 400 includes a pulley contact section 402 that is configured to engage with the groove of the pulley as previously illustrated in FIG. 6 with respect to generation component 12. The generation component 400 may be removably affixed to a pulley groove or a sheave groove without deviating from the invention. The pulley contact section 402 is connected to generator housing 404 through generator base 406. The generator housing 404 includes laser emitter component 405 that includes a laser emitter therein and a laser beam output portal 407. The housing 404 may be fabricated of a suitable material, such as a plastic, but not limited thereto. The housing 404 may be of a substantially square shape, as shown, or it may be of a different shape, such as to reduce the overall weight of the laser beam generation component 400. The laser emitter may be a DRM509-L0014 650 nm 5 mW laser cross module available from Instaspark of Santa Fe Springs, Calif. The laser beam output portal 407 is an opening in a front face of the housing 404. The portal 407 is arranged to allow passage of a laser beam of selectable shape. The laser beam shape may be a cross shape, for example. Wiring for powering the laser emitter pass through the housing 404 to a power supply.

The pulley contact section 402 includes a split stalk 408 that is connected to an interior 410 of the generator base 406 in a manner that permits the user to adjust internally the linear displacement of the pulley contact section 402 such as by threading the split stalk 408 and the interior 410 so that the split stalk 408 may be moved in and out of the target base 406. An exterior section 412 of the generator base 406 may also be threaded to enable linear movement of the generator housing 404 with respect thereto using adjustment ring 414. The pulley contact section 402 further includes single wedge 416 at end 418 of the split stalk 408. The single wedge 416 includes a first wedge member 420 and a second wedge member 422. The wedge members 420/422 are of a wedge shape so that the pulley contact section 402 may be inserted into the groove of the pulley and establish a tight friction fit of the laser beam generation component 400 therein. Internal wedge 417 provides backing force to enhance and maintain the frictional fit established with the single wedge 416. Surfaces of the wedge members 420/422 may be textured or otherwise modified to enhance that friction fit.

The split stalk 408 includes first stalk plank 424 and second stalk plank 426. Planks 424/426 are slightly curved outwardly so that at first end 428 they extend slightly apart as compared to their proximity at second end 430. This slightly outward curvature of the first stalk plank 424 and the second stalk plank 426 causes the wedge members 420/422 to extend outwardly and, as a result, increase the outwardly applied pressure of the pulley contact section 402 as the wedge members 420/422 move into the interior of the grooves of the pulley. The adjustability of the linear position of the split stalk 408 enables movement of the pulley contact section 402 into the groove of the pulley. That is, when the split stalk 408 is moved in the direction of first end 428 by rotating adjustment ring 414 toward first end 428 so as to hold planks 424/426 down and thereby applying pressure to the wedge members 420/422, thereby holding the pulley contact section 402 in place, and wedge members 420/422 engage the groove of the pulley, the predisposed outward curvature of the planks 424/426 increases the pressure or force supplied by the wedge members 420/422 in the engagement with the pulley groove so as to enhance the frictional contact between the laser beam generation component 400 and the pulley. The frictional contact may also be referred to as pressure contact, pressure fit, pressure engagement or frictional engagement with the same purpose of releasably engaging or releasably securing the pulley contact section 402 in the groove of the pulley without the need to bond or otherwise mechanically couple the pulley contact section 402 to the groove of the pulley. This configuration also provides stability and limited chance of disengagement or misalignment of the laser beam generation component 400 when positioned for use.

The present invention has been described with respect to various device features. Nevertheless, it is to be understood that various modifications may be made without departing from the spirit and scope of the invention. All equivalents are deemed to fall within the scope of this description of the invention as described by the following claims.

What is claimed is:

1. A device to be used for aligning a pulley with a sheave, wherein the pulley includes a groove and the sheave includes a groove, wherein either or both of the pulley and the sheave is adjustable, the device comprising:

a laser beam generation component coupled to a pulley contact section that is configured for releasable engagement with an interior surface of the groove of the pulley, wherein the laser beam generation component includes a face with a portal through which a laser beam of a selected shape passes, and wherein the pulley contact section includes a unitary stalk having a single wedge at an end thereof that releasably engages the pulley contact section with the groove of the pulley; and a laser beam target component coupled to a sheave contact section configured for releasable engagement with an interior surface of the groove of the sheave, wherein the laser beam target component includes a face with a target having a shape corresponding to the shape of the selected shape of the laser beam, and wherein the sheave contact section includes a unitary stalk having a single wedge at an end thereof that releasably engages the sheave contact section with the groove of the sheave, wherein when the laser beam generation component and the laser beam target component are positioned facing one another in the pulley and sheave, respectively, the laser beam from the laser beam generation component contacts the target of the laser beam target component and wherein when the laser beam aligns with the target, the pulley and the sheave are aligned.

2. The device of claim 1 wherein the single wedge of the pulley contact section comprises a first wedge member and a second wedge member, wherein the first wedge member and the second wedge member of the pulley contact section are spaced from one another by the end of the single stalk of the pulley contact section, wherein the single wedge of the sheave contact section comprises a first wedge member and a second wedge member, and wherein the first wedge member and the second wedge member of the sheave contact section are spaced from one another by the end of the single stalk of the sheave contact section.

3. The device of claim 2 wherein each of the first wedge member and the second wedge member of the pulley contact section and the sheave contact section includes an internal wedge.

4. The device of claim 1 wherein the pulley contact section and the sheave contact section are linearly adjustable.

5. The device of claim 4 wherein the pulley contact section and the sheave contact section each includes an adjustment collar.

6. The device of claim 1 wherein the laser beam generation component includes a laser beam emitter component positioned in a housing.

7. The device of claim 1 wherein the pulley includes a plurality of grooves.

8. The device of claim 1 wherein the sheave includes a plurality of grooves.

9. The device of claim 1 wherein the laser beam generation component includes wiring connected to a power supply.

10. A device to be used for aligning a pulley with a sheave, wherein the pulley includes a groove and the sheave includes a groove, wherein either or both of the pulley and the sheave is adjustable, the device comprising:
  a laser beam generation component coupled to a pulley contact section that is configured for releasable engagement with an interior surface of the groove of the pulley, wherein the laser beam generation component includes a face with a portal through which a laser beam of a selected shape passes, and wherein the pulley contact section includes a split stalk having a single wedge at an end thereof that releasably engages the pulley contact section with the groove of the pulley; and
  a laser beam target component coupled to a sheave contact section configured for releasable engagement with an interior surface of the groove of the sheave, wherein the laser beam target component includes a face with a target having a shape corresponding to the shape of the selected shape of the laser beam, and wherein the sheave contact section includes a split stalk having a single wedge at an end thereof that releasably engages the sheave contact section with the groove of the sheave,
  wherein when the laser beam generation component and the laser beam target component are positioned facing one another in the pulley and sheave, respectively, the laser beam from the laser beam generation component contacts the target of the laser beam target component and wherein when the laser beam aligns with the target, the pulley and the sheave are aligned.

11. The device of claim 10 wherein the single wedge of the pulley contact section comprises a first wedge member and a second wedge member, wherein the first wedge member and the second wedge member of the pulley contact section are spaced from one another by the end of the split stalk of the pulley contact section, wherein the single wedge of the sheave contact section comprises a first wedge member and a second wedge member, and wherein the first wedge member and the second wedge member of the sheave contact section are spaced from one another by the end of the split stalk of the sheave contact section.

12. The device of claim 11 wherein each of the first wedge member and the second wedge member of the pulley contact section and the sheave contact section includes an internal wedge.

13. The device of claim 10 wherein the pulley contact section and the sheave contact section are linearly adjustable.

14. The device of claim 13 wherein the pulley contact section and the sheave contact section each includes an adjustment collar.

15. The device of claim 10 wherein the laser beam generation component includes a laser beam emitter component positioned in a housing.

16. The device of claim 10 wherein the pulley includes a plurality of grooves.

17. The device of claim 10 wherein the sheave includes a plurality of grooves.

18. The device of claim 10 wherein the laser beam generation component includes wiring connected to a power supply.

19. The device of claim 10 wherein the split stalk of each of the pulley contact section and the sheave contact section includes a first plank and a second plank, and wherein the first plank and the second plank are curved outwardly to expand the single wedge so that it presses against the grooves of the pulley for the pulley contact section and against the grooves of the sheave for the sheave contact section.

20. The device of claim 19 wherein the single wedge of the pulley contact section comprises a first wedge member and a second wedge member, wherein the first wedge member is coupled to the first plank of the pulley contact section, the second wedge member is coupled to the second plank of the pulley contact section, wherein the single wedge of the sheave contact section comprises a first wedge member and a second wedge member, wherein the first wedge member is coupled to the first plank of the sheave contact section, and the second wedge member is coupled to the second plank of the split of the sheave contact section.

* * * * *